United States Patent [19]

Korver

[11] 4,071,504

[45] Jan. 31, 1978

[54] PROCESS FOR PRODUCING LOW CARBOXYL POLYESTER FIBERS AND OTHER ARTICLES

[75] Inventor: Gailerd L. Korver, Hartville, Ohio

[73] Assignee: The Goodyear Tire & Rubber Company, Akron, Ohio

[21] Appl. No.: 658,315

[22] Filed: Feb. 17, 1976

Related U.S. Application Data

[63] Continuation-in-part of Ser. No. 574,171, May 2, 1975, abandoned.

[51] Int. Cl.$^2$ .................... D01F 1/00; C08G 51/36
[52] U.S. Cl. .................... 260/75 EP; 260/75 T; 264/211
[58] Field of Search .............. 260/75 EP, 75 R, 75 T; 264/211

[56] References Cited

U.S. PATENT DOCUMENTS

| | | | |
|---|---|---|---|
| 2,921,051 | 1/1960 | Amborski et al. | 260/75 R |
| 3,372,143 | 3/1968 | Terada et al. | 260/75 EP |
| 3,627,867 | 12/1971 | Schwarz | 260/75 EP |
| 3,663,512 | 5/1972 | Uebe et al. | 260/75 EP |
| 3,673,144 | 6/1972 | Weissermel et al. | 260/75 EP |
| 3,746,686 | 7/1973 | Marshall et al. | 260/75 EP |
| 3,869,427 | 3/1975 | Meschke et al. | 260/75 EP |

FOREIGN PATENT DOCUMENTS

| | | | |
|---|---|---|---|
| 896,711 | 5/1962 | United Kingdom | 260/75 EP |
| 1,093,840 | 12/1967 | United Kingdom | 264/176 F |

*Primary Examiner*—Jay H. Woo
*Attorney, Agent, or Firm*—F. W. Brunner; J. M. Wallace, Jr.

[57] ABSTRACT

There is disclosed an improved process for preparing textile and industrial fibers by melt extruding a polyester resin from melt spinning apparatus to form filaments while adding to and reacting with said polyester resin while in said melt spinning apparatus a monofunctional epoxide wherein the improvement comprises incorporating in said polyester resin prior to extrusion thereof at least one catalytic compound consisting of an alkali metal salt in an amount ranging from about 0.01 to 10.0 parts by weight (calculation based on the alkali metal) per 1000 parts by weight of the polyester.

8 Claims, No Drawings

PROCESS FOR PRODUCING LOW CARBOXYL POLYESTER FIBERS AND OTHER ARTICLES

This application is a continuation in part of my application Ser. No. 574,171 filed May 2, 1975, now abandoned.

The present invention relates to an improved process for preparing shaped polyester articles such as multifilament and monofilament fibers and molded goods having low concentration of free carboxyl groups in the final shaped resins. More particularly this invention relates to an improved process for preparing such articles by extruding a mixture of a linear polyester and a monofunctional epoxide in the presence of an alkali metal salt of an acid.

Fibers of linear polyester resins such as polyethylene terephthalate have found wide acceptance in textile and industrial applications. However, it is well known that when shaped articles such as fibers are subjected during practical application to greater strain, prolonged high temperatures and the action of moisture, alcohol, acids or amines there occur thermal, hydrolytic, alcoholytic, acidalytic or aminolytic degradation processes which substantially diminish the molecular weight of the polyester and, thereby its strength, which can lead to the total destruction of the polyester. It is also well known that this degradation is due, in part, to the presence of the free carboxyl end groups in the polyesters of which the shaped articles are comprised, and that the higher this end group concentration the greater the degree of degradation.

It is also known that the most stable fibers and other shaped articles comprised of polyesters are those in which the free carboxyl end group concentration or content of the polyester is in the range of 15 equivalents per one million grams of polymer (eg./$10^6$ g.) and less.

Many solutions have been proposed for solving this problem, one of which is the employment of certain stabilizing materials such as monofunctional epoxides which are reactive with the carboxyl end groups. The use of these materials has proven to be highly successful, but because of the slow reaction between these materials and the carboxyl end groups of the polyester their use has engendered increased expenditures in time, equipment, etc. to ensure complete reaction.

A process has now been developed for producing textile and industrial fibers of low carboxyl content, i.e. carboxyl content in the range of 15 eq./$10^6$ g. and less, employing monofunctional epoxides which overcomes the need for the additional time, equipment, etc. required in the prior art processes. Particularly, a process has been developed wherein the reaction between the free carboxyl end groups of a polyester and a monofunctional epoxide is accelerated to the extent that complete or essentially complete reaction is made to take place between these constituents in the extrusion or spinning apparatus employed to convert the polyester resin into fiber. Thus the present invention comprises an improved process for producing textile and industrial fibers by melt extruding a polyester resin, having an intrinsic viscosity of at least 0.40, as measured in a 60/40 phenol/tetrachloroethane mixed solvent at 30° C. or a 50/50 trifluoroacetic acid/dichloromethane mixed solvent at 30° C., from melt spinning apparatus to form filaments while adding to and reacting with said polyester resin while in said apparatus for a period of from 1 to 6 minutes at least one monofunctional epoxide of the formulas

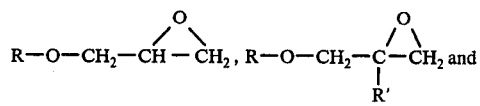

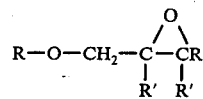

where R is selected from the group consisting of alkyl, cycloalkyl, alkenyl, aryl, substituted aryl and aralkyl radicals and R' = H or alkyl containing 1 to 8 carbon atoms wherein the improvement comprises incorporating in said polyester resin prior to extrusion thereof a catalytic material consisting of an alkali metal salt in an amount ranging from 0.01 to 10.0 parts by weight, based on the alkali metal, per 1000 parts by weight of the polyester.

The term "polyester" as used herein includes all linear polyesters and copolyesters based on dicarboxylic acids or the $C_1$ to $C_4$ alkyl esters thereof and glycols of the Series $HO(CH_2)_nOH$ where $n$ is an integer ranging from 2 to 10. The dicarboxylic acids which can be advantageously employed include, above all, terephthalic acid, isophthalic acid, diphenyl-p,p'-dicarboxylic acid and the naphthalene dicarboxylic acids. The dicarboxylic acids can be used as such or in the form of their $C_1$ to $C_4$ alkyl esters such as the dimethyl, diethyl, dipropyl or dibutyl alkyl esters. Glycols of the series $HO(CH_2)_nOH$ which are useful in preparing the above described polyesters include ethyleneglycol, propylene glycol, tetramethylene glycol, neopentyl glycol, hexamethylene glycol, decamethylene glycol and the like. In addition, glycols such as 1,4-dimethylol cyclohexane have also been found to be useful. The present invention is also applicable to polyesters prepared from various combinations of two or more of the above described acids, esters and glycols. The preferred polyester to which the present invention is applicable, however, is that in which at least 80 percent of the acid component consists of units of terephthalic acid and at least 80 percent of the glycol component consists of units of ethylene glycol.

The above described polyesters can be prepared by any of the polyester forming processes known in the art. Thus the polyesters can be prepared either by the esterification-polycondensation process employing a dicarboxylic acid and a glycol or the polyesters can be prepared by the transesterification-polycondensation process whereby a $C_1$ to $C_4$ alkyl ester of a dicarboxylic acid is reacted with a glycol to form the corresponding diglycol ester followed by the polymerization of the diglycol ester. The conditions of temperature, pressure, catalyst, etc. involved in carrying out the esterification or transesterification and polycondensation are all well known. (See, for example, U.S. Pat. No. 3,756,866)

The alkali metal salts which have been discovered to catalyze the reaction between the carboxyl ends in the polyester and the monofunctional epoxides defined herein include the alkali metal salts of compounds represented by the formula $R(COOM)_n$ wherein R is selected from the group consisting of hydrogen, hydroxyl radical, alkyl radicals containing from 1 to 20 carbon atoms, alkaryl, aryl and aralkyl radicals, $n = 1$ or 2 and M is an Alkali metal. Representative examples of useful carboxylic acid alkali metal salts include the lithium, sodium, potassium, rubidium and cesium salts of carbonic acid, formic acid, acetic acid, propionic acid, butyric acid, caproic acid, caprylic acid, capric acid, lauric acid, palmitic acid, stearic acid, benzoic acid, oxalic acid, malonic acid and the like. Also useful are salts of the formula MX where X = hydroxyl, alkoxyl or halide. The use of the lithium metal salts is preferred since they were observed to exhibit a greater catalytic effect and the lithium metal salts of carbonic acid, stearic acid and acetic acid, in that order, are the most preferred.

The above described acid salts in no way affect the preparation of the polyester and therefore can be added to the polyester forming process employed at any stage in the process. Thus these acid salts can be added to the initial polyester forming reactants or at any point during the esterification, transesterification or polycondensation stages. However, for convenience, the acid salts are most advantageously added prior to the polycondensation stage.

The amount of acid salt required to accelerate the reaction between the free carboxyl end groups of the polyester resin and the monofunctional epoxide is dependent on the residence time of the epoxide/polyester mixture in the extrusion or spinning apparatus. In commercial extrusion or spinning equipment this residence time will range from 1 to 6 minutes. In general, from 0.01 to 10.0 parts by weight of the acid salt (calculation based on the alkali metal) per 1000 parts by weight of the polyester resin is sufficient to promote the complete or essentially complete reaction between the carboxyl groups in the polyester resin and the epoxide over this time period. Most satisfactory results can be achieved when from 0.02 to 5.0 parts by weight of the acid salt (calculation based on the alkali metal) per 1000 parts by weight of the polyester resin is employed. Mixtures of these acid salts can also be employed.

As described hereinabove, the monofunctional epoxides used to lower the carboxyl concentration of the polyester are those epoxides corresponding to the formulas

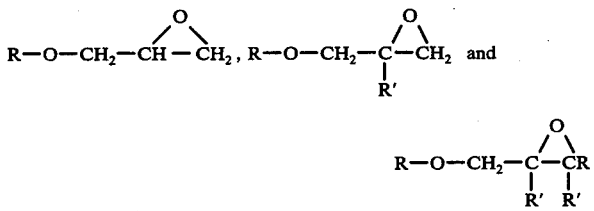

wherein the R and R' radicals are selected from the group consisting of alkyl, cycloalkyl, alkenyl, aryl, aralkyl and alkaryl radicals.

Representative examples of useful epoxides corresponding to the above formulas are those in which alkyl radicals can be radicals such s methyl, ethyl, propyl, the butyl, amyl, hexyl, heptyl and octyl radicals; cycloalkyl radicals can be radicals such as cyclopentyl and cyclohexyl; alkenyl can be radicals such as ethylene, propylene and butylene; aryl can be radicals such as phenyl; aralkyl radicals can be radicals such as benzyl and phenethyl; alkaryl radicals can be radicals such as tolyl, ethyl phenyl and xylyl and include phenyl glyicidyl ether, allyl glycidyl ether, butyl glycidyl ether, lauryl glycidyl ether, benzyl glycidyl ether, cyclohexyl glycidyl ether, α-cresyl glycidyl ether, p-tert.-butylphenyl glycidyl ether and the like.

The amount of monofunctional epoxide required to lower the carboxyl concentration of the polyester during its conversion to fibers is dependent on the carboxyl content of the polyester prior to extrusion into filaments. In general, the amount of monofunctional epoxide used will range from 0.1 to 2.0 percent by weight of the polyester.

Further, in the operation of the present invention the above described epoxides are added to polyester resin in conventional extrusion or spinning apparatus at the extrusion hopper with complete or essentially complete reaction of the epoxide with the free carboxyl end groups of the polyester taking place in the time required for the epoxide/polyester mixture to move through the extrusion or spinning apparatus. And, as noted hereinabove, this time will generally range from 1 to 6 minutes.

The invention is illustrated by the examples below. The terms "I.V." and "carboxyl content" cited in the examples are defined as follows: "I.V." represents the intrinsic viscosity of the polyester as determined in a 60/40 phenol/tetrachloroethane mixed solvent at 30° C. or trifluoroacetic acid/dichloromethane mixed solvent at 30° C. and is a measure of the molecular weight of the polyester. "Carboxyl content" represents the amount of free carboxyl end groups as determined by the method described by Pohl in ANALYTICAL CHEMISTRY, VOL. 26, page 1614 (1954), and is expressed in equivalents per million grams of polyester (Eq./$10^6$ grams). All parts and percentages are by weight unless otherwise stated.

EXAMPLE 1

A series of five polyethylene terephthalate resin samples was prepared in the following manner: 50 grams of low molecular weight prepolymer, derived from the esterification reaction of terephthalic acid and ethylene glycol, were added to a conventional laboratory glass reaction vessel along with a stabilizing amount of triphenyl phosphite and a catalytic amount of antimony trioxide and heated, under a nitrogen atmosphere, to 255° C. Once this mixture had melted the temperature was gradually increased to 275° C. and the pressure gradually reduced to 0.1 millimeter of mercury pressure and these polymerization conditions maintained for a period of two hours. Samples 2 to 5 contained various alkali metal acid salts. These acid salts were added to the reaction vessel at the same time as the initial low molecular weight prepolymer, triphenyl phosphite and antimony trioxide. The alkali metal salts were employed in a concentration of 0.02 part by weight, based on the alkali metal, per thousand parts by weight of the final polyester resin. At the end of the two hour polymerization period a small portion of each sample was removed for determination of I.V. and carboxyl end group concentration. Then 0.40 weight percent of phenyl glycidyl ether (PGE) was immediately added to the molten polyester samples remaining in the reaction vessels and mixed therewith for a period of 2.5 minutes at atmospheric pressure. The samples were then cooled, ground and subjected to determination of I.V. and carboxyl end group concentration. Table I below contains all pertinent data.

TABLE I

| Example No. | Alkali Metal Catalyst | Before PGE Addition IV | Before PGE Addition COOH | After PGE Addition IV | After PGE Addition COOH |
|---|---|---|---|---|---|
| 1 | — | 0.58 | 12 | 0.57 | 12 |
| 2 | LiOAc[a] | 0.58 | 12 | 0.52 | 0 |
| 3 | NaOAc | 0.61 | 10 | 0.59 | 6 |
| 4 | KOAc | 0.61 | 12 | 0.61 | 4 |
| 5 | CsOAc | 0.56 | 12 | 0.53 | 6 |

[a]The alkali metal acid salts were employed in the form of the alkali metal salts of acetic acid. Thus "OAc" represents the acetate radical in the above table.

The above experimental series demonstrates two important aspects of the invention: first, the alkali metal acid salts promote rapid reaction between the free carboxyl end groups of the polyester and the added epoxide; and second, these acid salts do not detrimentally influence the chemical properties of polyester.

EXAMPLE 2

A sample of polyethylene terephthalate was prepared by the esterification of a mixture of terephthalic acid and ethylene glycol and subsequent polycondensation of the esterification product employing conventional techniques. To the initial reaction mixture of terephthalic acid and ethylene glycol was also added 0.026 part by weight of sodium (as sodium acetate) and 0.025 part by weight of lithium (as lithium acetate) per 1000 parts by weight of the polyester resin. The melt polymerized resin containing the sodium and lithium salts was determined to have an I.V. of about 0.6. This resin was diced into cubes and solid state polymerized by tumbling the resin cubes in a blender-dryer at a temperature of 240° C. and a pressure of 0.5 millimeter of mercury pressure. The final solid state polymerized resin was determined to have an I.V. of 1.05 and a carboxyl end group concentration of 10 eq./$10^6$ g. This final solid state product was divided into four equal portions (Samples A, B, C and D) and dried to a moisture level of about 0.004 percent. Samples A and B were then extruded into fibers using a one inch NRM extruder. Samples C and D were extruded into fibers using a two inch Bouligny extruder. In the case of Samples B and D, 0.36 percent by weight of phenyl glycidyl ether (PGE) was added. The results are set forth in Table II below.

TABLE II

| Samples | I.V. | Carboxyl Content |
|---|---|---|
| Polyester Resin | 1.05 | 10 eq./$10^6$ g. |
| (A) Yarn (W/O PGE)[1] | 0.80 | 17 eq./$10^6$ g. |
| (B) Yarn (W/PGE)[2] | 0.78 | 7 eq./$10^6$ g. |
| (C) Yarn (W/O PGE) | 0.87 | 16 eq./$10^6$ g. |
| (D) Yarn (W/PGE) | 0.86 | 2 eq./$10^6$ g. |

[1]W/O PGE - without phenyl glycidyl ether
[2]W/PGE - with phenyl glycidyl ether From the above tables it is readily apparent that an alkali metal salt catalyzes the reaction between the carboxyl ends in polyester and an epoxide compound. It is also apparent that this catalyzed reaction can be carried out during the spinning of said resins into fibers, thus avoiding the economical drawbacks of prior art solutions.

EXAMPLE 3

A sample of polyethylene terephthalate was prepared by the esterification of a mixture of terephthalic acid and ethylene glycol and subsequent polycondensation of the esterification product employing conventional techniques. Thus to the initial reaction mixture of terephthalic acid and ethylene glycol was also added 0.005 part by weight of lithium (as lithium acetate) per 1000 parts by weight of the polyester resin. The esterified product was transferred to a second reactor and 0.015 part by weight of lithium (as lithium acetate) per 1000 parts of polyester resin was added along with a polycondensation catalyst (e.g. $Sb_2O_3$). The melt polymerized resin was further polymerized in the solid state to an I.V. of 1.01 and a carboxyl end group concentration of 4 Eq./$10^6$ g. This product was divided into two portions. One portion was kept as a control and p-tert.-butylphenyl glycidyl ether (0.47%) was added to the other portion of resin. The portions of resin were separately extruded to form 16 mil monofilament. The monofilaments were analyzed by carboxyl content. The results are shown in Table III.

TABLE III

| Samples | I.V. | Carboxyl Content |
|---|---|---|
| Resin alone before being extended | 1.01 | 4 Eq./$10^6$ g. |
| (E) Monofilament (w/o epoxide) | 0.81 | 10 Eq./$10^6$ g. |
| (F) Monofilament (w/ epoxide) | 0.78 | 2 Eq./$10^6$ g. |

EXAMPLE 4

This process can also be applied in the production of molded goods. Thus Poly(butylene terephthalate) can be readily prepared from dimethyl terephthalate and 1,4-butanediol using a titanate catalyst (e.g. du Pont's "Tyzor" TPT or TBT). The transesterification reaction (with evolution of methanol and by-product tetrahydrofuran) can be carried out in the 160° C. to 210° C. range. Upon completion any one of the alkali metal salts of this invention can be added to the reaction product and the polymerization carried out at 260° C. and 0.5 Torr. This polymer can then be compounded with fiberglass and the epoxy compound added during the injection molding step, which comprises melt mixing th materials in an extrusion apparatus and injecting the mixed compound into a suitable mold. The molding conditions listed in Table IV can be conveniently used.

TABLE IV

| Barrel Temp. ° C. | | Mold Cycle Time, Sec. | |
|---|---|---|---|
| Rear Zone | 238 | Injection | |
| Center Zone | 250 | | |
| Front Zone | 243 | High Pressure | 3 |
| Nozzle | 243 | Low Pressure | 5 |
| Melt Temp. ° C. | 250 | Cooling | 20 |
| Mold Temp. ° C. | 38 | Mold Open | 7 |
| | | Injection Pressure PSI | 18,000 |
| | | Back Pressure, PSI | 30 |
| | | Screw, RPM | 70 |

This process can also be applied to the formation of molded goods from other polyesters. However, it will be apparent to those skilled in the art that different molding conditions would be required for resins having different melting temperature and crystallization temperature.

While certain representative embodiments and details have been shown for the purpose of illustrating the invention it will be apparent to those skilled in this art that various changes and modifications may be made therein without departing from the spirit or scope of the invention.

What I claim is:

1. In the process for producing textile and industrial fibers both multifilament and monofilament or molded articles by melt extruding a polyester resin, having an intrinsic viscosity of at least 0.4 as measured in a 60/40 phenol/tetrachloroethane or 50/50 trifluoroacetic acid/dichloromethane mixed solvent at 30° C. from melt spinning apparatus to form the desired article while adding to and reacting with said polyester resin, while in said apparatus for a period of from 1 to 6 minutes, at least one monofunctional epoxide of the formulas

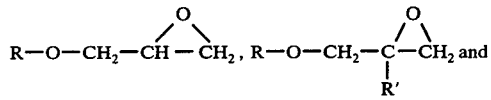

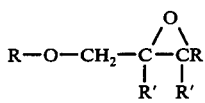

where R is selected from the group consisting of alkyl, cycloalkyl, alkenyl, aryl, substituted aryl and aralkyl radicals and R' is H or alkyl radical containing from 1 to 8 carbon atoms the improvement which comprises incorporating in said polyester resin prior to extrusion thereof at least one catalytic compound consisting of an alkali metal salt corresponding to the formula R(COOM)$_n$ where R is selected from the group consisting of hydrogen, hydroxyl radical, alkyl radicals containing from 1 to 20 carbon atoms and aryl radical, $n$ is selected from 1 and M is selected from the group consisting of alkali metals and in the formula MX, X = hydroxyl, alkoxyl or halide, said catalytic compound being incorporated in an amount ranging from 0.01 to 10.0 parts by weight, based on the alkali metal, per 1000 parts by weight of the polyester.

2. The improvement of claim 1 wherein the polyester resin is poly(ethylene terephthalate).

3. The improvement of claim 1 wherein the monofunctional epoxide is p-tert.-butylphenyl glycidyl ether, which is added to the polyester resin in the melt spinning apparatus in an amount ranging from 0.1 to 2.0 percent by weight based on the weight of the polyester.

4. The improvement of claim 1 wherein at least one R group of the monofunctional epoxide used is benzyl.

5. The improvement of claim 1 wherein at least one R group of the monofunctional epoxide used is cresyl.

6. The improvement of claim 1 wherein the catalytic compound added to the polyester resin, prior to the extrusion of said resin, consists of a lithium salt of a monocarboxylic acid selected from the group consisting of carbonic acid, stearic acid and acetic acid.

7. A monofilament produced according to claim 1.

8. In the process of forming a molded article from polyester resin the improvement which comprises reducing the carboxyl content of the polyester resin by the addition to the resin of a monofunctional epoxide and a catalyst consisting of an alkali metal salt and carboxylic acid.